United States Patent
Longeaud

(10) Patent No.: US 9,091,853 B2
(45) Date of Patent: Jul. 28, 2015

(54) DEVICE FOR FORMING AN INTERFERENCE GRATING ON A SAMPLE

(75) Inventor: Christophe Longeaud, Paris (FR)

(73) Assignee: Centre National de la Recherche Scientifique, Paris (FR)

( * ) Notice: Subject to any disclaimer, the term of this patent is extended or adjusted under 35 U.S.C. 154(b) by 83 days.

(21) Appl. No.: 13/976,554

(22) PCT Filed: Dec. 21, 2011

(86) PCT No.: PCT/IB2011/055857
§ 371 (c)(1),
(2), (4) Date: Jul. 10, 2013

(87) PCT Pub. No.: WO2012/093306
PCT Pub. Date: Jul. 12, 2012

(65) Prior Publication Data
US 2013/0286457 A1    Oct. 31, 2013

(30) Foreign Application Priority Data
Jan. 4, 2011  (FR) ..................... 11 00014

(51) Int. Cl.
*G02B 26/08* (2006.01)
*G01J 1/08* (2006.01)

(52) U.S. Cl.
CPC ............... *G02B 26/0816* (2013.01); *G01J 1/08* (2013.01); *Y02E 10/52* (2013.01)

(58) Field of Classification Search
CPC .... G02B 26/08; G02B 26/0816; Y02E 10/52; G01J 1/08

USPC ........................................................ 359/223.1
See application file for complete search history.

(56) References Cited

U.S. PATENT DOCUMENTS

| 4,891,582 A | | 1/1990 | Weiser et al. | |
|---|---|---|---|---|
| 5,122,817 A | * | 6/1992 | Hasegawa et al. | 399/5 |
| 5,827,971 A | * | 10/1998 | Hale et al. | 73/657 |
| 7,251,066 B2 | * | 7/2007 | Chao et al. | 359/22 |

FOREIGN PATENT DOCUMENTS

DE    37 32 065 A1    4/1988

OTHER PUBLICATIONS

International Search Report and Written Opinion for Application No.

* cited by examiner

*Primary Examiner* — Scott J Sugarman
*Assistant Examiner* — Ephrem Mebrahtu
(74) *Attorney, Agent, or Firm* — Alston & Bird LLP

(57) ABSTRACT

A device for forming an interference grating on a sample. The device including a laser emitting a light beam of wavelength $\lambda$, a beam splitter plate splitting the light beam into first and second beams, the first beam being deflected in a first direction, a first stationary deflection mirror for deflecting the first beam onto a point P of the sample at a first constant angle of incidence $\theta_1$, and at least one second stationary deflection mirror for deflecting the second beam along a final path that reaches point P of the sample at a second angle of incidence $\theta_2$ in order to form an interference grating on the sample at a pitch that depends on the angular difference $\theta$. The device includes a movable deflection mirror to deflect the second beam from a plurality of first deflection points towards a plurality of second deflection points on the second mirror.

22 Claims, 3 Drawing Sheets

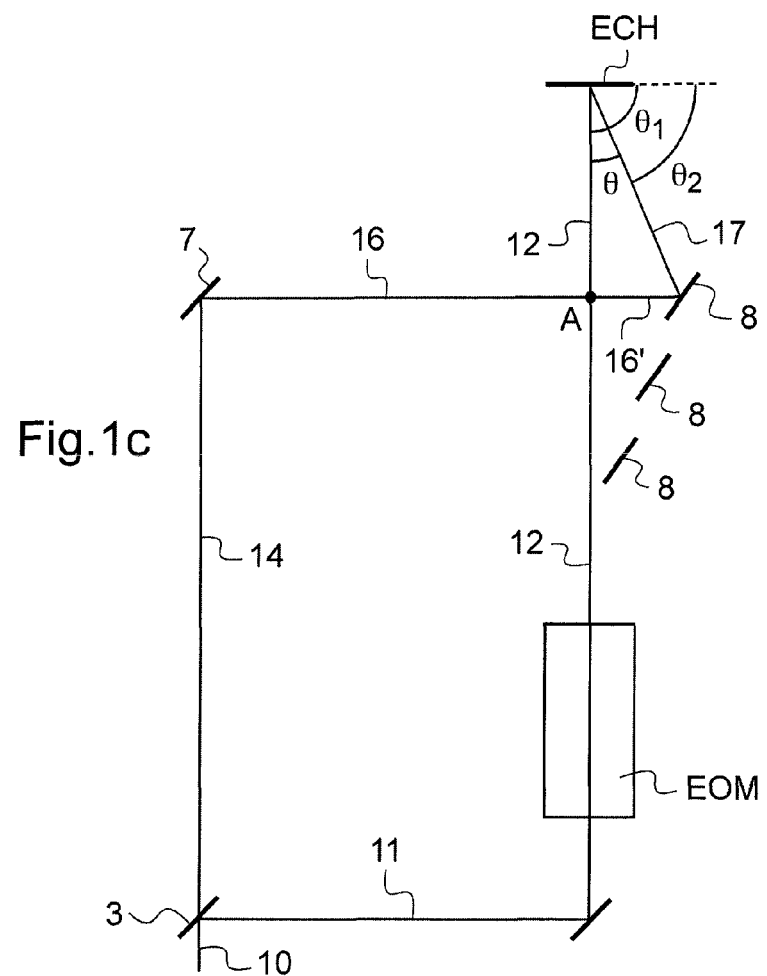
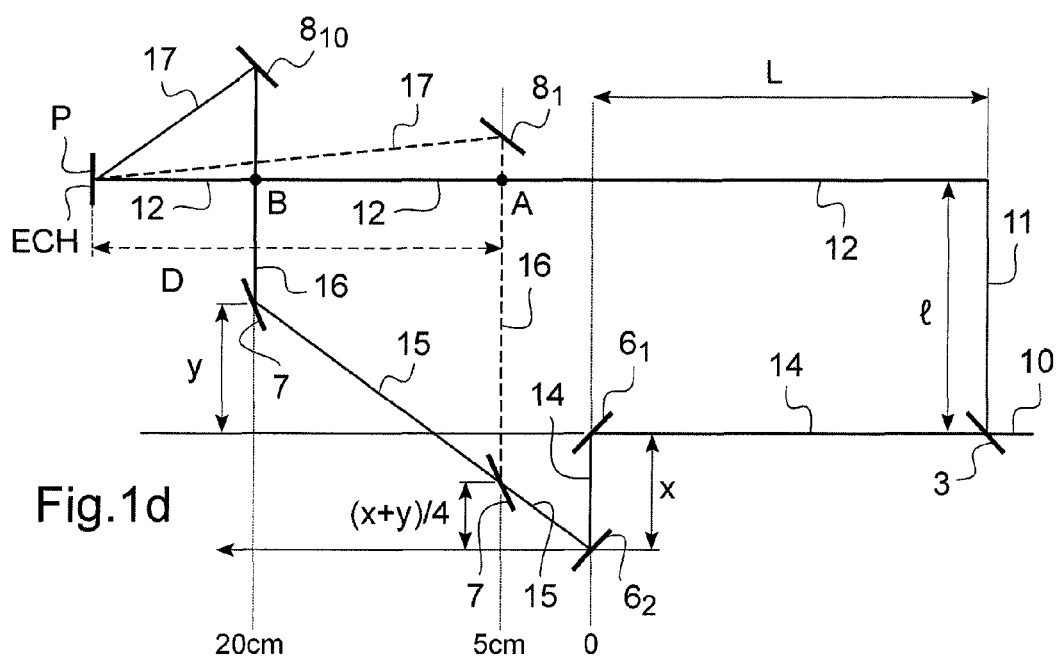

DEVICE FOR FORMING AN INTERFERENCE GRATING ON A SAMPLE

FIELD

The invention relates to a device for forming an interference grating on a sample, e.g. a photoconductive element, possibly having electrodes.

BACKGROUND

Forming an interference grating on a sample, and in particular on a photoconductive sample, makes it possible to activate the sample optically, and where appropriate to measure its properties.

Thus, U.S. Pat. No. 4,891,582 describes a technique for measuring the diffusion length $L_D$ of minority carriers in a photoconductive element.

That technique applies in particular to a thin layer photoconductive semiconductor that is for incorporating in photovoltaic modules.

Measuring this parameter makes it possible to determine the electronic quality of the thin film in order to verify whether it is suitable for being integrated in a photovoltaic module, i.e. whether it is suitable for obtaining good conversion efficiency.

Measuring the diffusion length $L_D$ of minority carriers in a thin film photoconductive semiconductor such as hydrogenated amorphous silicon is performed by laser interferometry.

The sample is constituted by a thin layer deposited on a substrate that is generally transparent and insulating and that has two parallel electrodes deposited thereon that are spaced apart by 1 millimeter (mm), for example. Electrical bias is applied between the two electrodes. A laser beam of vertically polarized light at a wavelength $\lambda$ is split into two beams that are then deflected onto the sample so as to form a given angle.

An interference grating is developed between the electrodes and the pitch of the grating depends on the angle between the two beams. This illumination gives rise to a certain level of photocurrent $I_w$.

By using a $\lambda/2$ halfwave plate, the polarization of one of the two beams is changed over so as to replace the inference grating by illumination that is uniform. This illumination gives rise to a certain level of photocurrent $I_{w0}$.

The direction of the measured photocurrent is perpendicular to the fringes of the grating. Thereafter, variation in the ratio $\beta = I_w/I_{w0}$ as a function of the pitch of the grating is plotted, where the pitch is calculated in known manner from the angle between the two beams and a correspondence using a simple equation makes it possible to deduce from this curve the diffusion length of the minority carrier.

The link between $\beta$ and $L_D$ is as follows. If the pitch of the grating is small, minority carrier diffusion eliminates the grating that has practically no influence on the measured current. The parameter $\beta$ is then close to 1. If the pitch of the grating is large, minority carrier diffusion can no longer eliminate it. An array of space charges and of local fields is then put into place, thereby modifying the majority carrier current, and the parameter $\beta$ may reach a value of $-1$.

This same space charge phenomenon lies behind the limit on current in a solar cell. In such a cell, if the minority carriers cannot diffuse, then the accumulation of minority carriers leads to a space charge being created that opposes the transport of majority carriers and that therefore gives rise to reduced efficiency. Thus, measuring $L_D$ on a thin film makes it easy to discover whether the film is suitable for integrating in a cell with significant chance of obtaining good efficiency prior to making the complete device, thus making such measurement most advantageous for all manufacturers of solar cells based on thin layers.

That technique is described in U.S. Pat. No. 4,891,582 and it applies to photoconductors and to semiconductors that are sensitive to light.

The implementation described in that document involves manual measurement, which is relatively difficult and lengthy to perform, since each step of the measurement, which corresponds to a different pitch of the interference grating, implies new adjustments.

SUMMARY

An object of the present invention is to provide a device that is compatible with automating the process, which device enables the pitch of an interference grating to be varied, in particular for the above-mentioned application.

The invention thus provides a device for forming an interference grating on a sample, e.g. constituted by a photoconductive element, the device comprising a laser emitting a light beam of wavelength $\lambda$, a beam splitter plate splitting the beam emitted by the laser into first and second beams, a first stationary deflection mirror for deflecting the first beam onto a point P of the sample at a first constant angle of incidence $\theta_1$, and at least one second stationary deflection mirror for deflecting the second beam along a final path that reaches said point P of the sample at a second angle of incidence $\theta_2$ in order to form an interference grating on the sample at a pitch that depends on the angular difference $\theta$ between the first and second angles of incidence $\theta_1$ and $\theta_2$, the path of the second beam being characterized in that it includes a movable deflection mirror to direct and deflect the second beam from a plurality of first points of impact from which the second beam is directed towards a plurality of corresponding second points of impact on a said second mirror, thereby forming a plurality of pairs of points of impact, each comprising first and second points of impact, each of which corresponding to a said final path of the second beam having a different value of the angle $\theta_2$, so as to cause the value of the angle of incidence $\theta_2$ to vary and thus vary the angular difference $\theta$, and in that the first points of impact are arranged on a linear or parabolic path extending from an upstream end remote from the sample where it is spaced apart from the direction of the beam emitted by the laser away from the segment of the first beam that impacts said point P of the sample, said linear or parabolic path being reentrant towards said segment of the first beam on going towards a downstream end closer to the sample so as to minimize optical path length variations of the second beam for the pairs of first and second points of impact, each of which corresponds to a respective value of the angular difference $\theta$.

In a first variant that makes it possible to provide appropriate compensation for the optical path length variation, the device is characterized in that it includes a pair of deflection mirrors on the path of the first segment of the second beam in order to deflect the second measurement beam downstream from the pair of deflection mirrors along a second segment forming a constant angle relative to the first segment, in that the second mirror is situated downstream from the pair of deflection mirrors and is constituted by a mirror that is movable in translation along the second segment, the second segment of the second beam striking the movable mirror at a plurality of said first points of impact in order to form a third segment downstream from the movable mirror that makes a constant angle with the second segment, and in that it includes at least two said second deflection mirrors that are prepositioned to deflect the third segment of the second beam that strikes said secondary deflection mirrors at said second points of impact, forming said final path that strikes said point P of the sample to define at least two different angles θ relative to the first beam.

In a preferred variant, the method is characterized in that it includes a mirror that is movable in rotation, a first parabolic mirror having its focus placed on the path of the second beam and on the axis of rotation of the mirror that is movable in rotation, the mirror that is movable in rotation deflecting the second beam from said focus onto the first parabolic mirror at a plurality of first points of impact in order to form an intermediate segment that strikes a second parabolic mirror at a plurality of said second points of impact, said point P of the sample ECH on which the first and second beams converge being situated at the focus of the second parabolic mirror.

The first segment of the second measurement beam is preferably collinear with the beam coming from the laser.

The device is advantageously characterized in that it presents a control module for controlling the movement of the movable mirror to constitute at least two measurement points.

The device may include an element for varying the polarization of the light, e.g. of the first beam, which device is advantageously a λ/2 halfwave plate, possibly coupled with a chopper, which may be arranged on an element that is movable in rotation, or else a rotary polarizer optionally coupled to an electro-optical modulator, so as to form an interference grating on the sample or else so as to subject it to uniform illumination.

The device may then include a device for measuring the values of the currents $I_w$ and $I_{w0}$ at each position, where $I_w$ corresponds to an interference grating being formed on the sample, and $I_{w0}$ corresponds to the sample being subjected to said uniform illumination.

The device preferably has a stepper motor for controlling the linear or rotary movement of the mirror that is movable in translation.

BRIEF DESCRIPTION OF THE DRAWINGS

Other characteristics and advantages of the invention appear better on reading the following description with reference to the drawings, in which:

FIGS. 1a to 1c show a first variant embodiment of the device of the invention, FIG. 1d being a diagram showing how optical paths are calculated.

DETAILED DESCRIPTION

Figures 1A, 1B:
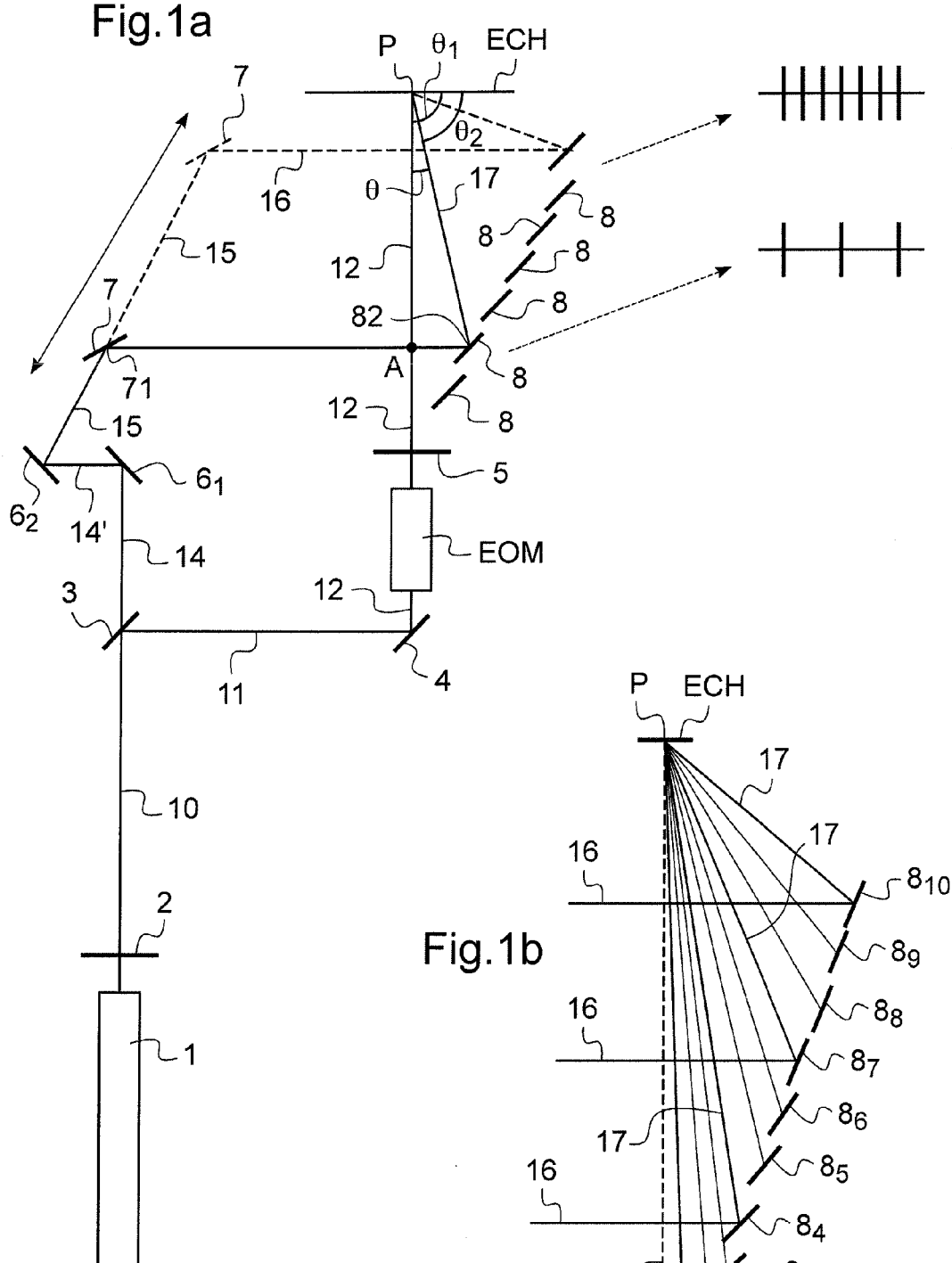

The device shown in FIG. 1 includes a laser 1 emitting a light beam that is linearly polarized by a polarizer 2, e.g. vertically.

The main beam 10 is split into two by a beam splitter mirror 3, so as to provide a first beam 11 that is reflected by the mirror 3 and a second beam 14 that is transmitted directly through the beam splitter mirror 3. The first beam is reflected on a mirror 4 in order to give a beam 12, which beam optionally passes through an electro-optical modulator EOM and a rotary polarizer 5.

In conventional manner, the function of the modulator EOM, possibly associated with the polarizer, is to modulate the intensity of the light in order to make it easier to perform measurements when picking up the signal from the terminals of the electrodes on the sample ECH and when processing the signal with the help of synchronous detection. This pair comprising the modulator EOM and the polarizer may advantageously be replaced by a chopper and a λ/2 halfwave plate.

The reflected beam 12 intercepts the surface of the sample ECH at a point P at a first angle of incidence $\theta_1$, e.g. at an angle of 90°.

The second beam 14 is deflected by two deflection mirrors $6_1$ (beam 14') and $6_2$ so as to form a second portion 15 that is inclined relative to the first beam portion 14.

A deflection mirror 7 that is linearly movable along the axis of the second beam portion 15 serves to form a third beam portion 16 that is deflected by one of the secondary deflection mirrors 8 of position and angle of inclination selected so that in each position of the deflection mirror 7 the fourth beam portion 17 that constitutes its final trajectory reaches the surface of the sample ECH at the point P with an angle of incidence $\theta_2$, forming an angle θ with the second beam portion 12 and specifically with the normal to the sample ECH, this angle θ being different for each of the deflection mirrors 8, thus making it possible, by varying the angle θ between the beam portions 12 and 17, to scan through a range of values for the pitch of the interference grating.

Each position of the deflection mirror 7 defines a first deflection point 71 that corresponds in one-to-one relationship with a second deflection point 82 from a secondary deflection mirror 8 so that the second beam reaches the point P.

If it is desired to perform the measurement method described in U.S. Pat. No. 4,891,582, then, at each position of the mirror 7 that is movable in translation, a measurement is made of the currents $I_w$ and $I_{w0}$. For this purpose, a halfwave plate 5 (or a rotary polarizer) is oriented so as to enable the two beams 12 and 17 that cross at the point P to have polarizations that are either parallel, thereby enabling them to create interference on the surface, thus making it possible to measure the current $I_w$, or else that are perpendicular, thus causing the interference grating to be replaced by uniform illumination, thus making it possible to measure the current $I_{w0}$.

The above-described device makes it possible to change the angle θ between the beams without needing to perform an adjustment, while also maintaining excellent superposition at the point P so that interference can form, thus making it possible in automatic manner to obtain interference gratings of different pitches, thereby making it possible in particular to perform measurements automatically.

Moving a single mirror with the help of a motor-driven linear carrier makes it possible to provide a movement step-size of about 1 micrometer (μm), which, in combination with the accurately defined positions of the stationary secondary deflection mirrors 8, makes it possible to ensure accurate deflection at a variety of preadjusted angles.

The device serves to take measurements in a range of interference grating pitch sizes extending typically from 1 μm to 15 μm, e.g. using a laser having a wavelength of λ=633 nanometers (nm).

Polarization is changed, e.g. by interposing a λ/2 halfwave plate or a rotary polarizer 5 placed on an element that can be controlled in rotation.

Automating measurements, i.e. controlling the movement of the mirror by means of a linear carrier and controlling the movement of the halfwave plate (or of the rotary polarizer) by means of a rotary carrier measuring currents and amplifying them, and then performing subsequent calculations relating to a measurement, e.g. calculating the diffusion length $L_D$ of the minority carriers, can all be controlled by a computer using specific software, and developed in a programming language known under the registered trademark Labview.

The path length differences between the two beams may be corrected as follows:

In order to use lasers that are relatively inexpensive, and that therefore do not present very great coherence length, it is necessary to ensure as much as possible that the optical path lengths of the two beams have values that are as close to each other as possible regardless of which deflection mirror 8 is used (FIG. 1*b*).

The layout of FIG. 1*c* shows, in contrast, a simple layout without compensation, in which the movable mirror 7 moves along the non-deflected segment 14 coming from the beam splitter plate 3. The lengths of the segments 14 and 16 between the beam splitter plate 3 and the point A where the beam portions 12 and 16 cross, present distances that are the same but optical paths that are not. The passage of the beam 12 through the crystal of the modulator lengthens its path by about 5 centimeters (cm) (crystal length×(n−1) where n is the refractive index of the crystal. In order to reach the sample ECH from the point A, the beam 16', 17 travels along the short side and the hypotenuse of a right angle triangle while the other beam 12 travels along the long side. Thus, the beam 16', 17 presents a path from point A to the sample ECH that is longer than that of the beam 12. Nevertheless, this does not always compensate the additional 5 cm that may be traveled by the beam 12 before it reaches the point A.

If the configuration of FIG. 1*c* is used, then the total path length differences between the beam 14, 16, 17 and the beam 11, 12 from the beam splitter plate 3 to the sample ECH lie in the range −4.3 cm for the deflection mirror $8_1$ to +3.6 cm for the deflection mirror No. $8_{10}$. The path length difference between the two beams on going from the first mirror to the last mirror thus vary by ±4 cm which may be prejudicial to good operation of the experiment when performed with lasers having short coherence length.

FIG. 1*b* shows a more detailed diagram of the arrangement of the deflection mirrors for achieving partial compensation. These mirrors are numbered $8_1$ to $8_{10}$. The beam 12 is represented by a dashed line and the various beams 16 are shown depending on the position of the mirror 7.

In order to compensate for these differences, the mirror $M_i$ is not moved parallel to the beam 12, but with a reentrant angle (FIGS. 1*a* and 1*d*) so as to increase the path length of the beam 14, 15, 16 when it strikes the deflection mirror $8_1$ and to decrease the same path length when it strikes the deflection mirror $8_{10}$. This correction can be partial only since the equations involved are not linear.

FIG. 1*d* shows the layout adopted for providing this compensation, at least in part.

The calculation below makes it possible to optimize this partial compensation.

The optical path length ChI traveled by the beam 14, 14', 15, 16, 17 from the beam splitter plate 3 to the sample ECH and passing via deflection mirror $8_1$ is calculated as follows:

$$ChI = L + x + \sqrt{25 + \left(\frac{x+y}{4}\right)^2} + \left[x - \left(\frac{x+y}{4}\right)\right] + l + D + 0.7 \quad (1)$$

where D designates the distance between the sample ECH and the point A where the beams 12 and 16 cross, and where 0.7 designates the extra path length (in cm) resulting from passing via the deflection mirror.

The optical path length ChII of the other beam (11, 12) that passes through the modulator EOM from the beam splitter plate 3 to the sample ECH is calculated as follows:

$$ChII = L + l + 5 + D + 5 \quad (2)$$

all of the magnitudes are expressed in cm. The last five cm in equation (2) comes from the additional path length in the modulator EOM. Finally, the following equation is used:

$$ChI - ChII = x + \sqrt{25 + \left(\frac{x+y}{4}\right)^2} + \left[x - \left(\frac{x+y}{4}\right)\right] - 10 + 0.7 \quad (3)$$

The optical path length Ch'I traveled by the beam 14, 14', 15, 16, 17 from the beam splitter plate 3 to the sample while passing via the deflection mirror $8_{10}$ is calculated as follows:

$$Ch'I = L + x + \sqrt{400 + (x+y)^2} - y + l + d + 8.6 \quad (4)$$

where $\underline{d}$ is the distance between the point B and the sample ECH, and 8.6 is the extra path length traveled on passing via the deflection mirror $8_{10}$. The optical path length ChII from the beam splitter beam 3 to the sample ECH is calculated in the same manner:

$$ChII = L + l + 20 + d + 5 \quad (5)$$

all of the magnitudes continue to be expressed in cm. The last 5 cm in equation (5) comes, as above, from the additional light path through the electro-optical modulator EOM. The following equation is obtained finally:

$$Ch'I - ChII = x + \sqrt{400 + (x+y)^2} - y - 20 + 3.6 \quad (6)$$

It is then possible to seek $\underline{x}$ and $\underline{y}$ so that equations (3) and (6) are zero, thereby obtaining a zero path length difference between the two beams, e.g. for the extreme mirrors $8_1$ and $8_{10}$. In other words this amounts to solving:

$$0 = x + \sqrt{25 + \left(\frac{x+y}{4}\right)^2} + \left[x - \left(\frac{x+y}{4}\right)\right] - 10 + 0.7$$

$$0 = x + \sqrt{400 + (x+y)^2} - y - 20 + 3.6$$

Which after lengthy but simple calculation gives x=3.46 cm and y=12.9 cm.

This correction is partial only since although the optical path length differences are zero for the mirrors $8_1$ and $8_{10}$, a similar calculation performed for the mirrors $8_4$ and $8_7$ gives respectively [CHI−CHII]=−0.75 cm and [Ch'I−ChII]=−0.97 cm. Nevertheless, it can be seen that the maximum optical path length difference is of no more than centimeter order, which makes it possible without prior processing of the light signals to use lasers having coherence lengths that are relatively short (a few cm) and thus relatively inexpensive, but perhaps not a laser diode.

It should be observed that it is possible to calculate an optimization in which the path length difference is made to be zero between two beams for some other pair of deflection mirrors, e.g. $8_2$ and $8_9$ or $8_4$ and $8_7$.

It should also be observed that the above calculation also applies when an electro-optical modulator is not used. The path length difference between the two beams may then be compensated, e.g. with the help of a pair of deflection mirrors.

In the drawings, an angle $\theta_1 = 90°$ has been selected. This is a preferred implementation since it facilitates adjustment of the optical bench. It can easily be seen that a rotation of the sample around the point P about an axis perpendicular to the plane of the figures does not change the way interference is formed, since the angle θ remains the same.

Furthermore, the segments 12 and 16 do not need to be perpendicular.

Accurate compensation may be obtained by using two parabolic mirrors facing in opposite directions with their focal axes being parallel.

The point P of the sample ECH is placed (FIG. 2) at the focus $F_2$ of an off-axis parabolic mirror $M_2$. At the focus $F_1$ of the other off-axis parabolic mirror $M_1$, there is placed the axis of rotation of a plane mirror 7' that, on rotating, serves to change the angle at which the beam 14 reaches the parabolic mirror $M_1$, while keeping both beams in the same plane. The path of a beam from point $F_1$ to the sample remains constant. Thus, the path length difference between the two beams is a constant that can be compensated by using a system of mirrors $9_1$ and $9_2$ to lengthen one or other of the paths, depending on the geometrical configuration.

Figure 2:
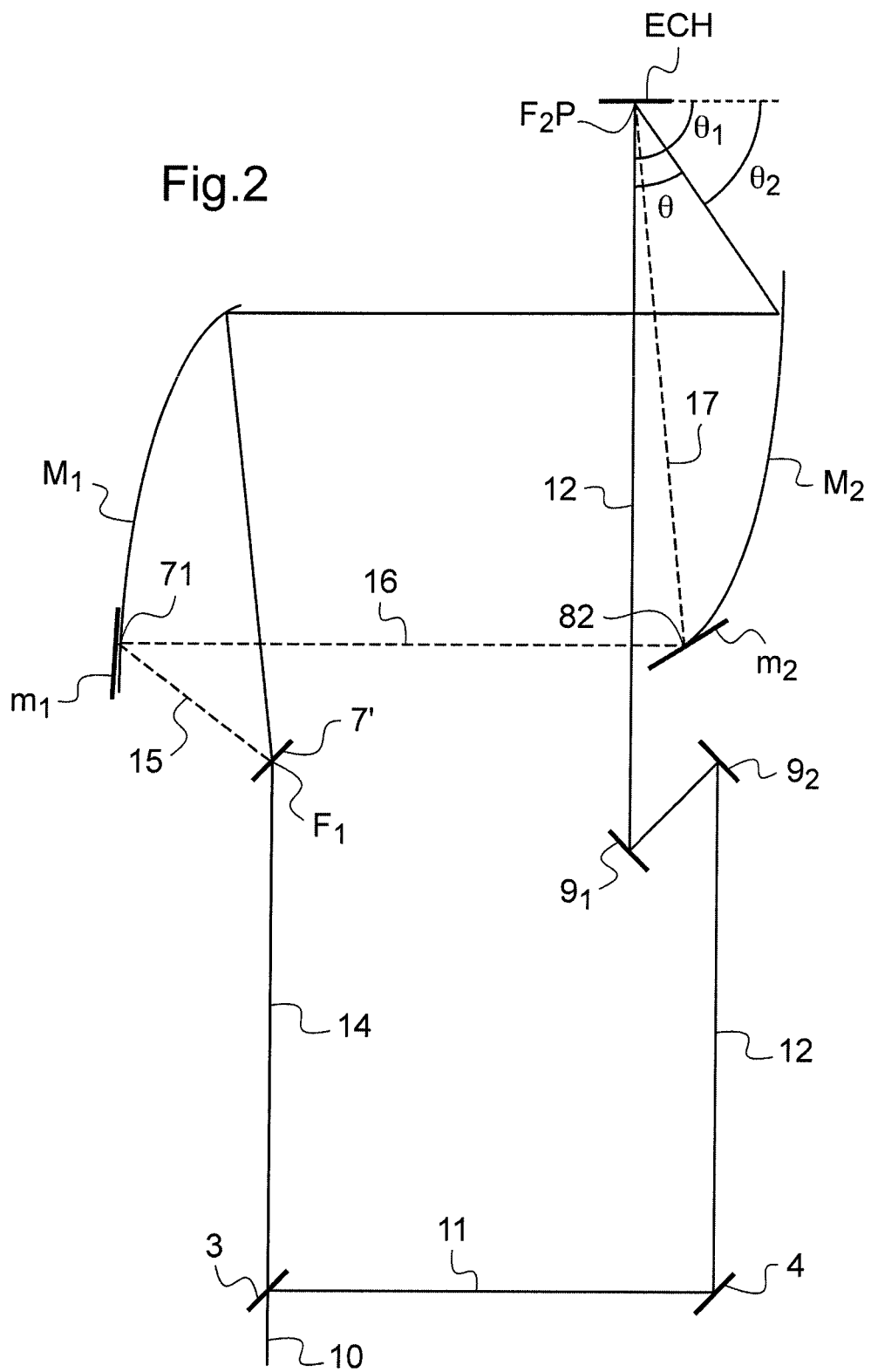
FIG. 2 shows a preferred, second variant of the device of the invention.

By way of example, in FIG. 2, the compensation is performed on the beam 12 (deflection mirrors $9_1$ and $9_2$).

Advantages a/ The path length difference between the two beams can be made accurately zero and thus make it possible to use laser diodes providing they are monomode diodes.

b/ The variation in the angle of the beam 17 striking the sample is continuous and no longer discrete as in the previously-described embodiment, and it is possible to set the value of this angle from the angle imposed on the mirror situated at the focus $F_1$ of the parabolic mirror.

c/ In the event of poor adjustment, the number of mirrors that need to be tested and adjusted once more is much smaller than in the previously-described embodiment.

EXAMPLE

Two parabolic mirrors on different axes and having the same focal length of 7.5 cm with a diameter of 7.5 cm giving a deflection angle at the center of about 60° and an offset between the axis of the parabolic and the axis of the mirror of about 10 cm.

One and/or the other of the parabolic mirrors may be replaced by a series of plane mirrors (see references $m_1$ and $m_2$ in FIG. 2) that are tangential at respective points 71 and/or 82 of the parabolic mirror that is replaced in this way, thereby leading to a limited number of pairs of points of impact 71 and 82.

The invention claimed is:

1. A device for forming an interference grating on a sample, the device comprising:

a laser emitting a light beam of wavelength λ, a beam splitter plate splitting the beam emitted by the laser into a first portion of a first beam and a first portion of a second beam, the first portion of the first beam being deflected in a first direction, a first stationary deflection mirror for deflecting the first portion of the first beam onto a point P of the sample at a first constant angle of incidence $\theta_1$, and and at least one second stationary deflection mirror for deflecting the first portion of the second beam along a final path that reaches said point P of the sample at a second angle of incidence $\theta_2$ in order to form an interference grating on the sample at a pitch that depends on the angular difference θ between the first angle of incidence $\theta_1$ and the second angle of incidence $\theta_2$, wherein the path of the second beam includes a deflection mirror movable in translation to direct and deflect the second beam from a plurality of first deflection points, formed by a plurality of positions of the movable mirror towards a plurality of second deflection points, formed by the positions of a plurality of second fixed mirrors having different orientations to ensure that the point P of the sample is always reached by the second beam, on a second mirror, thereby forming a plurality of pairs, each comprising first and second reflection points, each of which corresponding to a said final path of the second beam having a different value of the angle $\theta_2$, so as to cause the value of the angle of incidence $\theta_2$ to vary and thus vary the angular difference θ, and in that the first reflection points are arranged on a linear path extending from an upstream end remote from the sample where it is spaced apart from the beam emitted by the laser in the direction opposite to the first portion of the first beam to a downstream end closest to the sample, said linear path moving from the upstream end to the downstream end towards said second portion of the first beam so as to compensate at least in part for optical path length variations of the second beam for the pairs of first and second reflection points, each of which corresponds to a respective value of the angular difference θ.

2. A device according to claim 1, wherein the device includes a pair of deflection mirrors on the path of the first portion of the second beam in order to deflect the second beam downstream from the pair of deflection mirrors along a second portion forming a constant angle relative to the first portion, in that the second mirror is situated downstream from the pair of deflection mirrors and is constituted by a mirror that is movable in translation along the second portion, the second portion of the second beam striking the movable mirror at a plurality of said first reflection points arranged along a said linear path in order to form a third portion downstream from the movable mirror that makes a constant angle with the second portion, and in that it includes at least two said second deflection mirrors that are prepositioned to deflect the third portion of the second measurement beam that strikes said secondary deflection mirrors at said second reflection points along said final path that strikes said point P of the sample while making at least two different angles θ relative to the first measurement beam.

3. A device according to claim 2, wherein the first portion of the second measurement beam is collinear with the beam coming from the laser.

4. A device according to claim 1, wherein the device presents a control module for controlling the movement of the movable mirror to constitute at least two measurement points.

5. A device according to claim 1, wherein the device includes an element for varying polarization, which element is a λ/2 halfwave plate positioned on the path of a beam, so as to form an interference beam on the sample or so as to subject it to uniform illumination.

6. A device according to claim 5, wherein the halfwave plate is coupled to a chopper.

7. A device according to claim 1, wherein the device includes an element for varying polarization, which element is a rotary polarizer capable of forming an interference grating on the sample or of subjecting the sample to uniform illumination.

8. A device according to claim 7, wherein the device presents an electro-optical modulator interposed on the path of the first beam.

9. A device according to claim 5, wherein the device includes a device for measuring the values of the currents $I_w$ and $I_{w0}$ at each position, where $I_w$ corresponds to an interference grating being formed on the sample, and $I_{w0}$ corresponds to the sample being subjected to said uniform illumination.

10. A device according to claim 1, wherein the device includes a stepper motor for controlling the movement of the movable mirror.

11. A device according to claim 1, wherein the sample is a photoconductive element.

12. A device for forming an interference grating on a sample, the device comprising:

a laser emitting a light beam of wavelength $\lambda$, a beam splitter plate splitting the beam emitted by the laser into a first portion of a first beam and a first portion of a second beam, the first portion of the first beam being deflected in a first direction, a first stationary deflection mirror for deflecting the first portion of the first beam onto a point P of the sample at a first constant angle of incidence $\theta_1$, and at least one second stationary deflection mirror for deflecting the first portion of the second beam along a final path that reaches said point P of the sample at a second angle of incidence $\theta_2$ in order to form an interference grating on the sample at a pitch that depends on the angular difference $\theta$ between the first angle of incidence $\theta_1$ and the second angles of incidence $\theta_2$, wherein the path of the second beam includes a deflection mirror movable in rotation to direct and deflect the second beam from a plurality of first deflection points, formed by a plurality of reflection points of a first fixed parabolic mirror towards a plurality of second deflection points, formed by a plurality of deflection points of a second fixed parabolic mirror, on a second mirror, thereby forming a plurality of pairs, each comprising first and second reflection points, each of which corresponding to a said final path of the second beam having a different value of the angle $\theta_2$, so as to cause the value of the angle of incidence $\theta_2$ to vary and thus vary the angular difference $\theta$, and in that the first reflection points are arranged on a parabolic path, extending from an upstream end remote from the sample where it is spaced apart from the beam emitted by the laser in the direction opposite to the first portion of the first beam to a downstream end closest to the sample, said parabolic path moving from the upstream end to the downstream end towards said second portion of the first beam so as to compensate at least in part for optical path length variations of the second beam for the pairs of first and second reflection points, each of which corresponds to a respective value of the angular difference $\theta$.

13. A device according to claim 12, wherein the device includes a mirror that is movable in rotation, a first parabolic mirror having its focus placed on the path of the second beam and on the axis of the mirror that is movable in rotation, the mirror that is movable in rotation deflecting the second beam from said focus ($F_1$) onto the first parabolic mirror at a plurality of said first points of impact in order to form an intermediate portion of the second beam that strikes a second parabolic mirror at a plurality of said second points of impact, said point P of the sample on which the first and second beams converge being situated at the focus ($F_2$) of the second parabolic mirror.

14. A device according to claim 13, wherein the first portion of the second measurement beam is collinear with the beam coming from the laser.

15. A device according to claim 12, wherein the device presents a control module for controlling the movement of the movable mirror to constitute at least two measurement points.

16. A device according to claim 12, wherein the device includes an element for varying polarization, which element is a $\lambda/2$ halfwave plate positioned on the path of a beam, so as to form an interference beam on the sample or so as to subject it to uniform illumination.

17. A device according to claim 16, wherein the halfwave plate is coupled to a chopper.

18. A device according to claim 12, wherein the device includes an element for varying polarization, which element is a rotary polarizer capable of forming an interference grating on the sample or of subjecting the sample to uniform illumination.

19. A device according to claim 18, wherein the device presents an electro-optical modulator interposed on the path of the first beam.

20. A device according to claim 16, wherein the device includes a device for measuring the values of the currents $I_W$ and $I_{W0}$ at each position, where $I_W$ corresponds to an interference grating being formed on the sample, and $I_{W0}$ corresponds to the sample being subjected to said uniform illumination.

21. A device according to claim 12, wherein the device includes a stepper motor for controlling the movement of the movable mirror.

22. A device according to claim 12, wherein the sample is a photoconductive element.

* * * * *